United States Patent Office 3,299,111
Patented Jan. 17, 1967

3,299,111
UNSATURATED ACIDS DERIVED FROM POLYACETYLENIC COMPOUNDS
Bobby F. Adams, Painesville, Ohio, and John H. Wotiz, Huntington, W. Va., assignors to Diamond Alkali Company, Cleveland, Ohio, a corporation of Delaware
No Drawing. Filed Jan. 2, 1963, Ser. No. 248,861
3 Claims. (Cl. 260—413)

This invention relates to new compositions of matter, and in particular to novel compounds represented by the formula

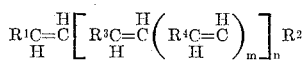

wherein $R^1$ and $R^2$ are selected from the group consisting of hydrogen, alkyl (e.g., methyl, ethyl, n-propyl, isopropyl, butyl), amino-alkyl, carbamato-alkyl, $COOR^5$ and

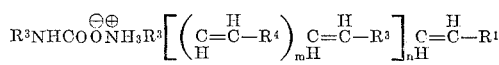

wherein $R^3$ and $R^4$ are divalent hydrocarbon radicals containing straight chains of at least one carbon atom; $R^5$ is selected from the group consisting of hydrogen, alkyl, aryl (e.g., phenyl, naphthyl and substituted derivatives thereof) and aralkyl (e.g., benzyl, phenethyl and substituted derivatives thereof); $m$ is a number from 0 to 1, inclusive; and $n$ is a number from 1 to 100, inclusive.

Still more particularly, this invention relates to novel compounds represented by the following formula

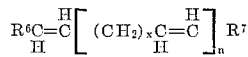

wherein $R^6$ and $R^7$ are selected from the group consisting of hydrogen, carboxy, $(CH_2)_xNH_2$, $(CH_2)_xNHCOOH$ and

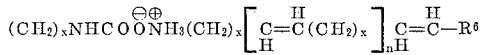

$x$ is a number from 1 to 20, inclusive; and $n$ is as defined hereinbefore.

Specific illustrative examples of compounds of this invention include the following:

1-trans-7-trans-13,19-eicosatetraene

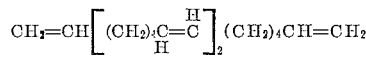

trans-2-trans-8-trans-14,20-heneicosatetraene-1-oic acid

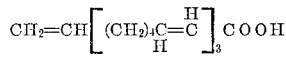

1-amino-trans-5,11-dodecadiene

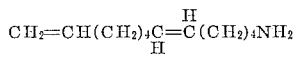

trans-5,11-dodecadienylammonium-trans-5,11-dodecadienylcarbamate

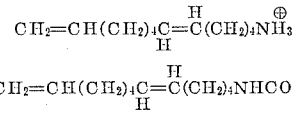

1,16-diamino-trans-5-trans-11-hexadecadiene

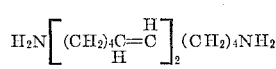

16-amino-trans-5-trans-11-hexadecadienylcarbamic acid

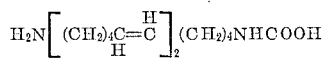

Compounds of this invention may be prepared from polyacetylenic compounds of the formula $$R^1C{\equiv}C[R^3C{\equiv}C(R^4C{\equiv}C)_m]_nR^2$$

wherein $R^1$, $R^2$, $R^3$, $R^4$, $m$ and $n$ are as defined hereinbefore, by chemical reduction with metallic sodium dissolved in liquid ammonia.

Normally, when pure sodium is added to liquid ammonia, it dissolves and forms a blue solution from which metallic sodium may be recovered by allowing the ammonia to evaporate. On the other hand, the addition of a small amount of a ferric salt and the passage of air for a very short time through the solution results in the oxidation of the sodium to sodamide, with simultaneous liberation of hydrogen.

It is the blue solution of elemental sodium which is used in the process of this invention. Generally, enough sodium is used to furnish a 100 to 200 percent excess over the stoichiometric amount required for reduction of all triple bonds. The stoichiometric amount is two gram-atoms of sodium per gram-equivalent of polyacetylenic compound. It is usually convenient to add the compound to be reduced slowly to the sodium solution; if desired, the compound to be reduced may be dissolved in an inert solvent, such as ether, hexane, dioxane, or the like. However, the inverse method of addition also may be employed; that is, the polyacetylenic compound may be added to the liquid ammonia first, followed by gradual addition of the sodium. The reduction is sometimes carried out in the presence of a lower alkanol, such as methanol, or ammonium ions, e.g., ammonium sulfate.

After the reagents have all been added, the mixture is usually stirred for some time, e.g., 30 minutes to 8 hours, after which the ammonia is allowed to evaporate and the reaction mixture is decomposed by the cautious addition of water, alcohol, or the like. The desired product may then be isoalted and purified by distillation or recrystallization if desired.

Amines of this invention are usually quite susceptible to reaction with carbon dioxide and must be kept out of contact with the atmosphere. They may be converted into the respective carbamic acid derivatives by treatment, either in the free state or in solution, with carbon dioxide.

The compounds of this invention are effective as pesticides for controlling fungi, bacteria, smuts, mildew, nematodes and other organisms in the class of plant pests.

While it is possible to apply the compounds of the present invention in undiluted form to the plant or other material to be protected, it is frequently desirable to apply the novel compounds in admixture with either solid or liquid inert, pesticidal adjuvants. Thus, the compounds can be applied to the plants for fungicidal purposes, for example, by spraying them with aqueous or organic solvent dispersions of the compound. Similarly, wood surfaces can be protected by applying a protective film of the compound by brushing, spraying, or dipping utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons, such as benzene, toluene, xylene, kerosene, diesel oil, fuel oil, petroleum, naphtha; ketones such as acetone, methyl ethyl ketone and cyclohexanone; chlorinated hydrocarbons such as carbon tetrachloride, chloroform, trichloroethylene, perchlorethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols, such as ethanol, isopropanol and amyl alcohol, etc.

The compounds can also be applied to plants and other materials along with inert solid fungicidal adjuvants or carriers such as talc, pyrophyllite, attaclay, kieselguhr, chalk, diatomaceous earth, lime, calcium carbonate, bentonite, fuller's earth, cotton-seed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkyl-phenolethylene oxides, e.g., p-isooctyl phenol condensed with 10 ethylene oxide units; and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention can be employed in compositions containing other pesticides, more especially fungicides, insecticides and bactericides, e.g., phenothiazine, pyrethrum, rotenone, DDT, etc.

The following examples are offered in order that those skilled in the art may achieve a fuller understanding of the invention and the preferred methods by which the same may be carried into effect. It should be understood, however, that the invention is not to be limited by these examples, since modifications thereof may be made which are within the full intended scope of the invention as defined in the appended claims.

EXAMPLE 1

*Preparation of 1,7,13,19-eicosatetrayne*

A five-liter, three-necked flask, equipped with a stirrer, Dry Ice condenser and gas inlet tube, is charged with 3 liters of liquid ammonia and 234 g. (6 moles) of sodamide. Four and one-half moles of acetylene is measured into the stirred suspension at which point the mixture begins to clear, and then the gas inlet tube is replaced by an addition funnel and 648 g. (3 moles) of 1,4-dibromobutane is added slowly as stirring is continued.

The ammonia is allowed to evaporate overnight and the residual mixture is hydrolyzed by cautious addition of about 300 ml. of water. The aqueous and organic layers are separated and the aqueous layer is extracted several times with 100 ml. portions of ether. The ether extracts and organic layer are combined, washed with 5 percent aqueous solutions of hydrochloric acid and sodium carbonate and dried over calcium sulfate.

After removal of the ether by evaporation, the residue is distilled under reduced pressure. The desired 1,7,13,19-eicosatetrayne boils at 165° to 170° C. per 0.3 mm. Hg.

EXAMPLE 2

*Preparation of 1-trans-7-trans-13,19-eicosatetraene*

To a stirred solution of 74 g. (3.2 gram-atoms) of sodium in 1 liter of liquid ammonia is slowly added a solution of 53.3 g. (0.2 mole) of 1,7,13,19-eicosatetrayne in 150 ml. of anhydrous ether. The mixture is stirred for one hour, and then 300 ml. of water is added cautiously. The ammonia is allowed to evaporate overnight, and the remaining equeous suspension is extracted with ether. The ether extracts are dried over calcium chloride and concentrated. There is obtained 52.5 g. of an amber liquid which is shown by infrared and vapor phase chromatographic analysis to be a mixture of four components, the mixture containing both triple and trans-double bonds.

A portion (21.8 g.) of this mixture is dissolved in 96 g. of methanol and 1 liter of liquid ammonia and further reduced by inverse addition of 57.5 g. (2.5 gram-atoms) of sodium. After workup, the product (19.8 g.) contains two components. It is further reduced by the inverse addition method using 128 g. of methanol and 69 g. (3 gram-atoms) of sodium. The product, 1-trans-7-trans-13,19-eicosatetraene, is distilled, B.P. 129–130° C. per 0.5 mm. Hg. The yield is 17.5 g. of pure material as shown by infrared and vapor phase chromatographic analysis.

Analysis for $C_{20}H_{34}$. Calculated: C, 87.5%; H, 12.5%. Found: C, 87.3%; H, 12.4%.

EXAMPLE 3

*Preparation of 2,8,14,20-heneicosatetrayne-1-oic acid*

Three moles of 1,7,13,19-eicosatetrayne disodium salt is prepared from 798 g. (3 moles) of 1,7,13,19-eicosatetrayne and 7 moles of $NaNH_2$ in 3.5 liters of anhydrous ammonia. The ammonia is replaced by 6 gallons of a 1:1:1 (by volume) mixture of benzene, ethyl ether and tetrahydrofuran and the suspended salt is pressurized with $CO_2$ at 25° C. and 500 p.s.i. in a 10-gallon autoclave for 60 hours. After venting, the mixture is hydrolyzed with 1 gallon of water. The organic layer is separated and dried and the solvent is evaporated; there is recovered 354 g. of impure unreacted 1,7,13,19-eicosatetrayne. The aqueous solution is acidified with hydrochloric acid and the precipitated solid is extracted with ether. After evaporation of the ether the residue is treated with pentane in a Soxhlet extractor, yielding 133 g. (26% conversion) of soluble white product, M.P. 54–55° C. which is identified as 2,8,14,20-heneicosatetrayne-1-oic acid. The results of the chemical analysis indicate the formation of the desired $C_{21}H_{26}O_2$, and are as follows:

| Element | Actual Percent by Weight | Calculated Percent by Weight |
|---|---|---|
| Carbon | 80.9 | 81.3 |
| Hydrogen | 8.4 | 8.4 |

The actual neutralization equivalent found is 313, while the calculated value is 310. The infrared spectrum is consistent with the assigned structure.

EXAMPLE 4

*Preparation of trans-2-trans-8-trans-14,20-heneicosatetraene-1-oic acid*

A solution of 23.2 g. (0.08 mole) of 2,8,14,20-heneicosatetrayne-1-oic acid in 150 ml. of anhydrous ether is added rapidly to a stirred solution of 46 g. (2 gram-atoms) of sodium in 1 liter of liquid ammonia. The mixture is stirred for one and one-half hours and hydrolyzed by the cautious addition of 150 ml. of water. The ammonia is allowed to evaporate overnight and the residue is poured into a slurry of concentrated hydrochloric acid and ice. The solid which precipitates is extracted with ether and the extracts are washed with water and dried over calcium chloride.

The ether is removed by evaporation, leaving a yellow oil which solidifies at about 11° C. The infrared spectrum is in agreement with the assigned structure of trans-2-trans-8-trans-14,20-heneicosatetraene-1-oic acid. The yield is 21.5 g., or 90% of the theoretical amount.

Analysis for $C_{21}H_{34}O_2$. Calculated: C, 79.1%; H, 10.7%; neutral equivalent, 318%. Found: C, 78.8%; H, 10.5%; neutral equivalent, 336%.

EXAMPLE 5

*Preparation of 1,16-diamino-5,11-hexadecadiyne and 1-amino-5,11-dodecadiyne*

1,7-octadiyne, 630 g. (6 moles), is added to a suspension of 468 g. (12 moles) of sodamide in one gallon of liquid ammonia. The resulting suspension of 1,7-octadiyne disodium salt is added in portions to a solution of 2592 g. (12 moles) of 1,4-dibromobutane in 2 gallons of liquid ammonia in a 5-gallon stirred autoclave. The mixture is stirred for three hours, and then the autoclave is sealed and heated to 50° C. for three hours. The mixture is cooled and the autoclave is vented. After most of the ammonia has evaporated, the residue is diluted with water and extracted with 5 liters of ether. Carbon dioxide is passed through the ether solution and the resulting precipitate is filtered. Upon treatment of the solids with 10% aqueous sodium hydroxide solution, the desired 1,16-diamino-5,11-hexadecadiyne separates as an oil. It is dried out of contact with air and distilled, B.P. 152° C./0.05 mm. Hg. The product is very sensitive to atmospheric carbon dioxide and must be kept out of contact with it.

The ethereal filtrate from the carbon dioxide treatment is distilled. After removal of the ether, the desired 1-amino-5,11-dodecadiyne is obtained, B.P. 82–85° C. per 0.05 mm. Hg.

Analysis:

| | Calculated | Found |
|---|---|---|
| 1,16-Diamino-5,11-hexadecadiyne ($C_{16}H_{28}N_2$). | Carbon, 77.4 | 78.1 |
| | Hydrogen, 11.3 | 10.9 |
| | Nitrogen, 11.3 | 10.7 |
| | Molecular weight, 248 | 239 |
| 1-Amino-5,11-dodecadiyne ($C_{12}H_{19}N$). | Carbon, 81.3 | 80.4 |
| | Hydrogen, 10.8 | 10.3 |
| | Nitrogen, 7.9 | 7.7 |
| | Molecular weight, 177 | 170 |

EXAMPLE 6

*Preparation of 1-amino-trans-5,11-dodecadiene*

A solution of 53.2 g. (0.3 mole) of 1-amino-5,11-dodecadiyne in 150 ml. of anhydrous ether is added slowly, with stirring, to a solution of 55.2 g. (2.4 gram-atoms) of sodium in 1 liter of liquid ammonia. The mixture is stirred for one hour, after which 300 ml. of water is added cautiously. The bulk of the ammonia is allowed to evaporate and the residue is extracted with ether. The ether extracts are washed with water and dried over calcium sulfate, and the ether is removed by evaporation. Upon distilling the residue (46.8 g.) at reduced pressure under nitrogen, there is obtained 99 percent pure (by vapor phase chromatographic analysis) 1-amino-trans-5,11-dodecadiene, B.P. 73–74° C. per 0.6 mm. Hg. The product is very sensitive to atmospheric carbon dioxide.

Analysis for $C_{12}H_{23}N$. Calculated: C, 79.5%; H, 12.8%; N, 7.7%. Found: C, 79.2%; H, 12.9%; N, 8.1%.

EXAMPLE 7

*Preparation of trans-5,11-dodecadienylammonium-trans-5,11-dodecadienylcarbamate*

Thirty grams of 1-amino-trans-5,11-dodecadiene is placed in a Petri dish and exposed to carbon dioxide. A solid is formed (about 35 g) which decomposes when treated with solvents, but forms again upon evaporation of the solvent. Infrared and elemental analysis confirm the assigned structure as trans-5,11-dodecadienylammonium-trans-5,11-dodecadienylcarbamate.

Analysis for $C_{25}H_{46}N_2O_2$. Calculated: C, 73.8%; H, 11.4%; N, 6.9%. Found: C, 74.0%; H, 10.9%; N, 8.1%.

EXAMPLE 8

*Preparation of 1,16-diamino-trans-5-trans-11-hexadecadiene*

To a stirred suspension of 38.4 g. of methanol and 24.8 g. (0.1 mole) of 1,16-diamino-5,11-hexadecadiyne in 1 liter of liquid ammonia is added, in small portions, 18.4 g. (0.8 gram-atom) of sodium. Stirring is continued for one-half hour, and the mixture is then cautiously diluted with 400 ml. of water. The ammonia is allowed to evaporate and the residue is extracted with ether. Upon purification as in Example 6, the desired 1,16-diamino-trans-5-trans-11-hexadecadiene is obtained, B.P. 146 to 148° C. per 0.5 mm. Hg, M.P. 31 to 33° C. The product is very sensitive to carbon dioxide.

Analysis for $C_{16}H_{32}N_2$. Calculated: C, 76.2%; H, 12.8%; N, 11.1%. Found: C, 76.5%; H, 12.5%; N, 11.3%.

EXAMPLE 9

*Preparation of 16-amino-trans-5-trans-11-hexadecadienylcarbamic acid*

An ether solution of 1,16-diamino-trans-5-trans-11-hexadecadiene is treated with carbon dioxide. The product, 16-amino-trans-5-trans-11-hexadecadienylcarbamic acid, precipitates and is filtered and washed with ether. The yield is quantitative.

Analysis for $C_{17}H_{32}O_2N_2$. Calculated: C, 68.9%; H, 10.9%; N, 9.5%. Found: C, 68.8%; H, 10.8%; N, 9.6%.

EXAMPLE 10

Fungicidal activity

The tomato foliage disease test measures the ability of the test compound to protect tomato foliage against infection by the early blight fungus *Alternaria solani* and the late blight fungus *Phytophthora infestans*. Results from this test indicate whether a compound may have practical use as a foliage protectant fungicide.

The method used employs tomato plants (var. Bonny Best) five to seven inches high which are four to six weeks old. Duplicate plants, one set for each test fungus, are sprayed with 100 ml. of the test formulation at 40 pounds air pressure as the plants are rotated on a turntable in a hood. The center of the turntable is 45 inches from the nozzle of the spray gun.

The test formulations used in this procedure contain 1000 p.p.m. and 200 p.p.m., respectively, of the compound being tested and are prepared by mixing 0.1 g. of the test compound, 4 ml. of acetone and 2 ml. of a stock solution of Triton X-155 emulsifier in water (0.5% Triton X-155 by volume), and diluting with water to 100 ml. This solution is used directly for the 1000 p.p.m. test, and is diluted with water to 20% for the 200 p.p.m. test.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight, lesion counts are made on the three uppermost fully expanded leaves. The data are converted to percentage disease control based on the number of lesions obtained on the control plants.

The following table gives the responses of several of the compounds of this invention when tested by this method.

| Compound | Concentration, p.p.m. | Percent Control | |
|---|---|---|---|
| | | Early blight | Late blight |
| 1-amino-trans-5,11-dodecadiene | 1,000 | 100 | 100 |
| | 200 | 99.7 | 99.1 |
| 1,16-diamino-trans-5-trans-11-hexadecadiene | 1,000 | 93 | 96 |
| | 200 | 89 | 93 |
| Trans-5,11-dodecadienylammonium trans-5,11-dodecadienylcarbamate | 1,000 | 100 | 100 |
| | 200 | 99 | 99.4 |
| 16-amino-trans-5-trans-11-hexadecadienylcarbamic acid | 1,000 | 94 | 100 |
| | 200 | 63 | 93 |

EXAMPLE 11

Bactericidal activity

Test chemicals are examined for ability to inhibit the growth of four bacterial species (*Erwinia amylovora*, *Xanthomonas phaseoli*, *Micrococcus pyogenes* var. *aureus*, *Escherechia coli*) at a concentration of 250 p.p.m. The first two and fourth above-named test species are gram negative rods, the third species is gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbidimetric measurement.

Each of four test tubes arranged in a rack receive one ml. of the test formulation which is prepared by mixing 0.1 g. of the test compound, 4 ml. of acetone and 2 ml. of the stock solution of Triton X-155 emulsifier (see Example 10) and diluting with water to 80 ml.

After the test formulations have been measured into a test tube, 3½ ml. of distilled water and ½ ml. of bacterial suspension for each respective test organism is added to each test tube. (The final concentration of the test chemical is 250 p.p.m.) The medication tubes are then set aside at room temperature for four hours. After this exposure period transfers are made by means of a standard four mm. platinum loop to 7 ml. of sterile broth in test tubes arranged in racks similar to those for the medication tubes. The broth tubes are then incubated for 48 hours at 29° to 31° C. at which time growth is measured by use of a Bausch and Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks.

The following four compounds are 100% effective against all four species of bacteria when tested by this method: 1-amino-trans-5,11-dodecadiene; 1,16-diamino-trans-5-trans-11-hexadecadiene; trans-5,11-dodecadienylammonium trans-5,11-dodecadienylcarbamate; 16-amino-trans-5-trans-11-hexadecadienylcarbamic acid.

What is claimed is:

1. Compounds of the formula

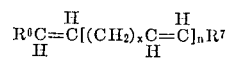

wherein $R^6$ is selected from the group consisting of hydrogen and carboxy; $R^7$ is carboxy; $n$ is an integer from 2 to 100, inclusive; and $x$ is an integer from 1 to 20, inclusive.

2. The compounds of claim 1 wherein $R^6$ is hydrogen and $x$ is the integer 4.

3. Trans - 2-trans-8-trans-14,20-heneicosatetraene-1-oic acid.

References Cited by the Examiner

UNITED STATES PATENTS

| | | | |
|---|---|---|---|
| 2,895,869 | 7/1958 | Bluestone | 167—22 |
| 2,934,570 | 4/1960 | Goldberg et al. | 260—413 X |
| 3,016,327 | 1/1962 | Schmitz et al. | 167—22 |
| 3,031,512 | 4/1962 | Osbond et al. | 260—413 X |
| 3,032,491 | 5/1962 | Barton et al. | 260—413 X |
| 3,032,583 | 5/1962 | Chiusoli et al. | 260—413 X |
| 3,033,884 | 5/1962 | Osbond et al. | 260—413 |
| 3,052,699 | 9/1962 | Beal | 260—413 |
| 3,053,868 | 9/1962 | Schmerling et al. | 260—413 |

OTHER REFERENCES

Fieser et al.: Advanced Organic Chemistry, N.Y., Reinhold, 1961 pp. 229 and 230.

Whitmore: Organic Chemistry, N.Y., D. Van Nostrand, 1937, p. 50.

CHARLES B. PARKER, *Primary Examiner.*

G. MENTIS, R. L. RAYMOND, *Assistant Examiners.*